May 16, 1939.  L. C. DOANE  2,158,653

PASSENGER VEHICLE LIGHTING

Filed July 8, 1936  2 Sheets-Sheet 1

INVENTOR
Leroy C. Doane
BY
ATTORNEY

May 16, 1939.  L. C. DOANE  2,158,653
PASSENGER VEHICLE LIGHTING
Filed July 8, 1936  2 Sheets-Sheet 2

INVENTOR
Leroy C. Doane
BY
ATTORNEY

Patented May 16, 1939

2,158,653

UNITED STATES PATENT OFFICE 2,158,653

PASSENGER VEHICLE LIGHTING

Leroy C. Doane, Meriden, Conn., assignor to The Miller Company, Meriden, Conn., a corporation of Connecticut Application July 8, 1936, Serial No. 89,536

12 Claims. (Cl. 240—7.35)

The present invention relates to passenger vehicle lighting, and is more particularly directed toward vehicle lighting wherein spaced ceiling carried units are employed for direct lighting, and also to direct lighting units adapted for such purposes, as well as the illumination of other interiors.

The present invention contemplates vehicle lighting wherein lighting units are placed in rows over the seats of the vehicle and each lighting unit is designed to provide intense lighting over an area approximately equal to that which is employed by the occupants of the seat (or seats) underneath it, as well as to contribute to the general lighting of the vehicle. To this end, the units have an enclosing shade of suitable ornamental appearance and preferably made of glass of a slightly diffusing nature, whereby the interior of the unit is concealed against observation when the units are in use and the dominant light rays may be directionally transmitted. An enclosed reflector confines the spread of the dominant rays and shields the side walls of the shade, these side walls being illuminated by light scattered inside the shade and providing general illumination for the vehicle.

The invention also contemplates lighting units for these purposes which have a very low brightness in the ordinary line of sight and which may be easily serviced.

Other and further objects will appear as the description proceeds.

The accompanying drawings show, for purposes of illustrating the present invention, two of the many embodiments in which the invention may take form, it being understood that the drawings are illustrative of the invention rather than limiting the same.

In these drawings.

Figure 1:
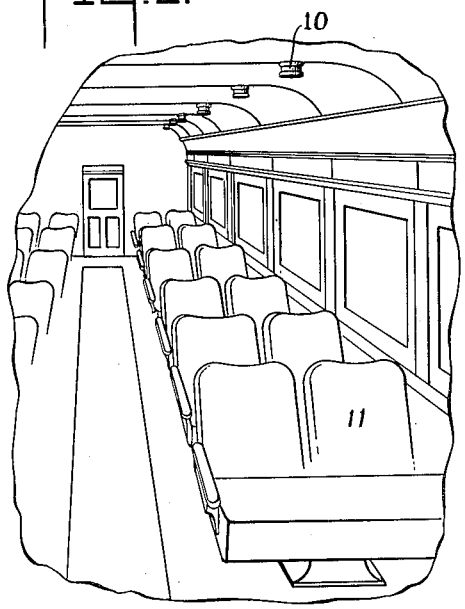
Fig. 1 is a perspective view illustrating the interior of a passenger vehicle provided with one form of lighting equipment contemplated herein.
Figure 2:
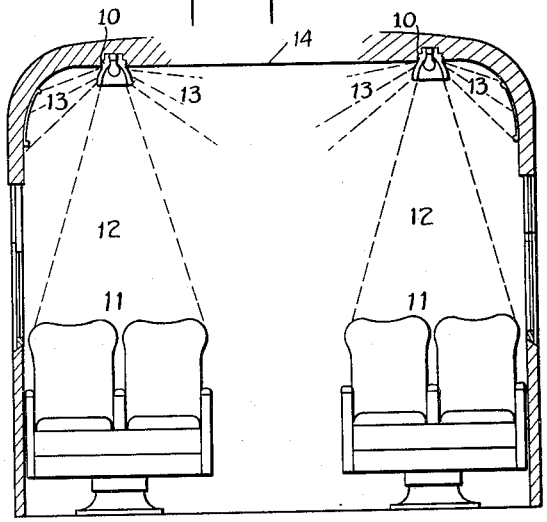
Fig. 2 is a cross sectional view through the passenger vehicle illustrating the arrangement of seats, aisle and lighting units.

Referring to Figs. 1 and 2 of the drawings, it will be seen that the lighting units 10 are spaced in rows appearing over each of the rows of seats 11 with which the vehicle is provided.

Each unit is designed to produce intense lighting directly underneath the unit, as indicated at 12, the intense lighting being spread sufficiently to include the width of the seats of the row, as well as to cover the positions assumed by the seats when turned back and forth. The lighting units also provide high angle light as illustrated at 13 for illuminating the upper part of the vehicle and any advertising cards which may be provided.

Figure 3:
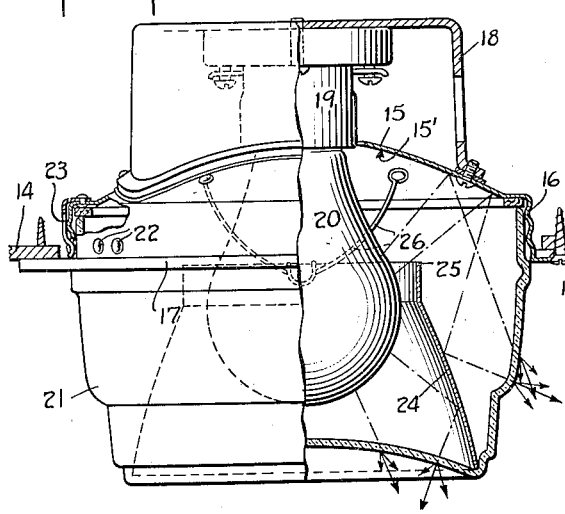
Fig. 3 is a vertical cross sectional view through a form of lighting unit such as appears in Figs. 1 and 2.

The form of unit illustrated in Fig. 3 is designed to be recessed into the ceiling 14 of the vehicle. It is provided with a sheet metal shade (or globe) supporting member 15 having a screw-threaded skirt 16 and an outer flange 17 to facilitate mounting it in the ceiling. The upper part of the shade support has an internal reflecting surface 15' for reflecting light received by it downwardly. The stamping 15 supports a socket carrying member 18, preferably in the form of a closed housing. The socket is indicated at 19 and a pendant lamp bulb at 20.

A shade or globe 21, made of glass, or other translucent material, is screw-threaded at its upper end to fit the threads in the holder and is provided with bumps 22 to be engaged by a spring clip 23 to prevent unloosening. An enclosed metal reflector 24 is disposed about the lamp bulb. It is open at the top 25 and bottom and may be supported in place in any suitable manner. Here it is shown as fitting the bottom of the shade, being held down against the shade bottom by springs, such as indicated at 26, so that the parts will not rattle in use. The upper end 25 of the reflector is spaced from the lamp bulb somewhat as indicated and extends high enough to shield or screen the side walls of the shade against direct light.

The downwardly emitted direct and reflected light passes through the bottom of the shade and is slightly diffused thereby. This portion of the shade is only slightly diffusing so as to conceal or obscure the lamp bulb and reflector without materially affecting the direction of the light beams proceeding from the light source or reflector. In this way, the region of intense lighting can be confined to a desired area. Upwardly directed light from the light source passing above the upper edge 25 of the reflector strikes the upper reflector 15' provided by the shade holder and is returned downwardly between the outside of the first reflector and the side walls of the shade. These light rays are scattered about and diffusely transmitted by the side walls of the shade. These side walls are also slightly diffusing so as to conceal the interior of the lighting unit from observation. The light rays from the side walls illuminate the upper part of the vehicle as above described.

Figure 4:
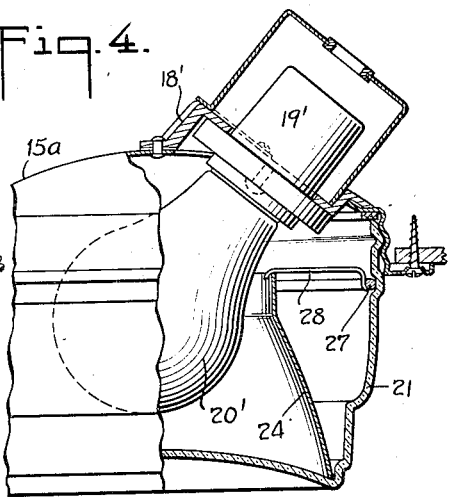
Fig. 4 is a cross sectional view through a slightly modified form of unit for the same general purposes as the unit shown in Fig. 3.

In the modified form of construction illustrated in Fig. 4, the shade holder 15a is similar to the shade holder 15, except that it is designed to accommodate an obliquely disposed lamp bulb 20' supported in a lamp socket 19' carried in a socket holder 18'. The reflector 24 and shade (or globe) 21 may be the same as previously shown and described. Instead of pressing the reflector downward by a spring carried by the fixed shade holder, as shown in Fig. 3, a modified form of spring clip is illustrated. It consists of a ring 27 carried in an annular recess in the side walls of the shade and a number of springs 28 carried by the ring and engaging the top of the reflector. Either form of anti-rattling device may be employed with either form of socket support.

While the structure shown in detail in Figs. 3 and 4 is one designed to use lamp bulbs of the type employed in railway car lighting, it will be understood that structures designed similar to those herein shown in detail, are entirely suitable for use in busses and other motor vehicles. The parts may be made smaller in size and automotive lamps and lamp sockets employed.

Figure 5:
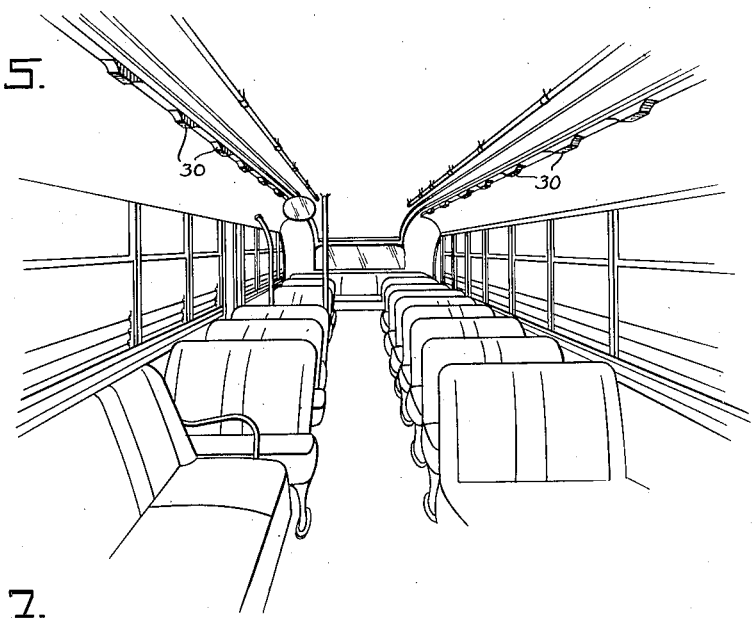
Fig. 5 is a perspective view showing a vehicle interior with a modified form of lighting unit.
Figure 7:
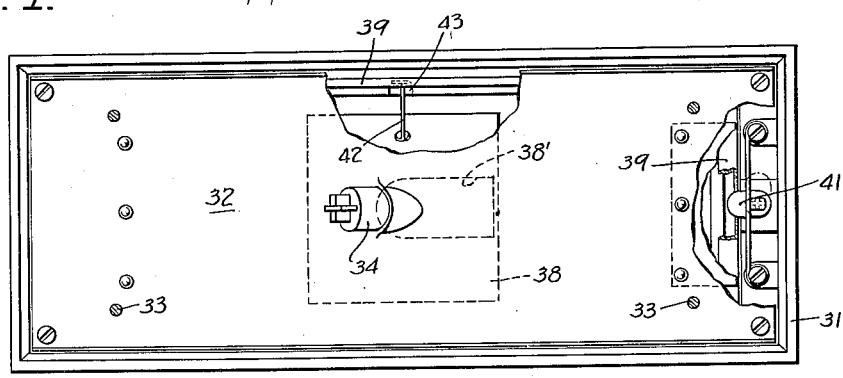
Fig. 7 is a top plan view of the lighting unit shown in Fig. 6.
Figure 6:
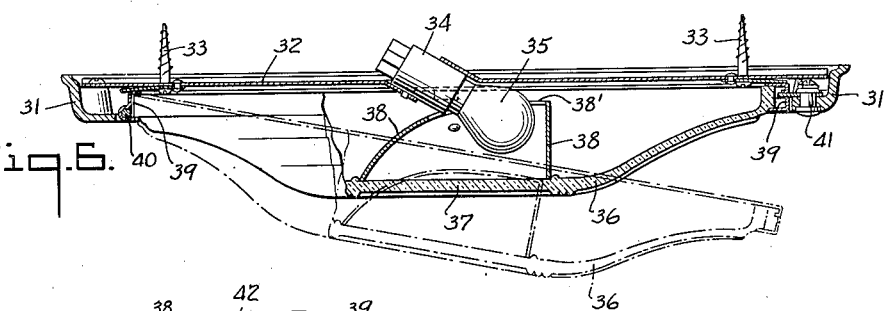
Fig. 6 is a longitudinal sectional view through a form of lighting unit such as appears in Fig. 5.
Figure 8:
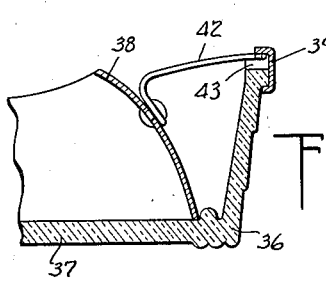
Fig. 8 is a fragmentary view illustrating a detail of construction.

In the arrangement shown in Fig. 5, a number of elongated shallow lighting units 30, designed more particularly for busses, are placed in a row over each row of seats. These units may be isolated units or made up in the form of a continuous lighting trough. Where isolated units are employed, each unit as herein shown, is provided with a rectangular frame 31 which carries a plate 32. The plate is adapted to be secured to the ceiling of the bus or other vehicle by screws indicated at 33. The plate carries an automotive lamp socket indicated at 34, designed to hold a lamp bulb 35 just below the plate.

A rectangular glass shade 36 is supported about the lamp bulb. This shade has a central portion 37 of maximum depth and has sloping end portions as indicated. It is preferably made of glass or other slightly diffusing translucent material. The dominant light rays are projected down through the central portion 37 of the shade by means of a reflector 38 having a hole 38' to accommodate the lamp bulb, and allow some light to pass upwardly against a plate 32. This light is scattered toward the ends of the glass shade.

In the form shown, the reflector is shaped to produce a beam asymmetric in longitudinal planes, and the brightness of the right hand end portion of the glass shade will be somewhat less than the brightness of the left hand end portion of the shade, thereby reducing the brightness of reflections in the windshield of the bus carrying this equipment. A symmetrical shade may be employed, if desired.

The shade may be carried in a suitable frame, such as indicated at 39, hingedly supported at 40 and locked in place by a locking key indicated at 41. The reflector 38 may be held in position by springs 42 which enter notches 43 in the glass and passes underneath the shade supporting band 39.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A lighting unit adapted to be supported by a vehicle ceiling over a row of seats and comprising a light source, an upwardly-opening, downwardly-removable ceiling-carried, one piece shade, a light concentrating reflector within the shade to intercept a wide vertical angle of light and screen the source against observation except from underneath and to project a concentrated beam of light downwardly through the bottom of the shade, the bottom of the shade being slightly diffusing to obscure the source and reflector from observation by persons in the seats without substantial interference with the direction of emission of the direct and reflected light, the reflected beam having a spread to include the width of the seats in the row, the side walls of the shade being spaced from the reflector and sufficiently diffusing to obscure the reflector, the reflector being supported from the shade bottom and open at the top to allow upward escape of light, and a supplemental reflector for directing such upwardly escaping light down between the first reflector and side walls of the shade for diffusion by the shade to illuminate the ceiling and upper side walls of the vehicle.

2. A lighting unit such as set forth in claim 1, having a downwardly acting spring means for holding the first mentioned reflector against the bottom of the shade.

3. A lighting unit such as set forth in claim 1, wherein the first reflector extends to a height sufficient to screen the entire side walls of the shade against direct light.

4. A lighting unit such as set forth in claim 1, wherein the shade has upwardly extending aligning elements which engage the bottom of the reflector to prevent lateral movement of the reflector in the shade.

5. A direct lighting fixture comprising a light source, a reflector about the source for reflecting light downwardly, said reflector having an opening at its top, a reflector above the source for receiving upwardly emitted light and reflecting it downwardly outside of the first reflector, a shade support, and an enclosing bowl-shaped, one piece shade releasably secured to the shade support and having a closed bottom portion of limited diffusion and co-extensive with the opening in the first reflector for obscuring the source and first reflector and directionally transmitting direct and reflected light, and diffusing side walls screened from direct rays of light by the first reflector for diffusely transmitting light redirected by the second reflector, the first mentioned reflector being supported by the shade and being downwardly removable therewith.

6. A direct lighting fixture, as claimed in claim 5, wherein the mouth of the first reflector engages aligning elements carried by the shade, and having spring means to hold the said reflector against the shade.

7. A direct lighting fixture comprising a downwardly opening shade holder provided on its lower face with a reflecting surface, a lamp socket carried by the shade holder, a lamp bulb in the socket and disposed below the reflecting surface, a shade open at the top and removably carried by the shade holder and having downwardly extending side walls and a closed bottom of an area substantially less than that of the top of the shade, a shade enclosed reflector open at its top and bottom, the reflector concentrating light downward and screening the side walls of the shade from direct rays of light, the reflecting surface of the shade holder receiving light emitted above the reflector and having a shape to diverge the reflected rays and scatter them downwardly between the shade walls and the reflector, the shade being slightly diffusing for directional transmission of light and for screening the source, the reflecting surface of the shade holder, and reflector against observation, the bottom of the shade having upwardly extending aligning elements which engage the bottom of the reflector to prevent lateral movement of the reflector in the shade, and spring means to hold the reflector against the bottom of the shade.

8. A direct lighting fixture comprising a downwardly opening shade holder provided on its lower face with a reflecting surface, a lamp socket carried by the shade holder, a lamp bulb in the socket and disposed below the reflecting surface, a shade removably carried by the shade holder and having downwardly extending side walls and a closed bottom wall, a shade enclosed reflector open at its top and bottom and engaging the bottom of the shade for concentrating light downward and screening the side walls of the shade from direct rays of light, and spring means for holding the reflector in position in the shade, the reflecting surface of the shade holder receiving light emitted above the reflector and scattering it downwardly between the shade walls and the reflector, the shade being slightly diffusing for directional transmission of light and for screening the source and reflector against observation.

9. A direct lighting fixture as claimed in claim 8, wherein the spring means is secured to the shade holder and reflector so that the reflector may be supported from the shade holder when the shade is removed.

10. A direct lighting fixture as claimed in claim 8, wherein the spring means is secured to the reflector and shade so that the reflector is removable with the shade.

11. In a direct lighting fixture, a shade having slightly diffusing side walls and an integral closed bottom, a reflector having a bottom opening in contact with the bottom of the shade, a downwardly opening lamp socket, a lamp bulb in the socket, a shade holder for supporting the socket and having a threaded connection with the top of the shade, the bulb passing through an opening in the upper end of the reflector, the reflector screening the side walls of the shade from direct rays of light below the shade holder and projecting light downwardly through the bottom of the shade, the top of the reflector being open for escape of light upwardly, the shade holder intercepting such light and reflecting it down between the shade and reflector, and spring means for pressing the reflector against the shade.

12. A direct lighting fixture comprising a fixed rectangular support, a lamp socket carried thereby, a lamp bulb in the socket, the bulb being below the support, a slightly diffusing shade having a rectangular open top and held adjacent the support, the shade having a central portion of maximum depth for the entire width of the shade and end portions of decreasing depth, and an open topped reflector screening off the end portions of the shade from direct rays of light and directing the main beam downwardly through the central portion of the shade, the light escaping through the top of the reflector being scattered by the support for illuminating the end portions of the shade.

LEROY C. DOANE.